(12) United States Patent
Kawamoto

(10) Patent No.: US 8,145,050 B2
(45) Date of Patent: Mar. 27, 2012

(54) LENS DRIVE DEVICE

(75) Inventor: Hisashi Kawamoto, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 0 days.

(21) Appl. No.: 12/571,794

(22) Filed: Oct. 1, 2009

(65) Prior Publication Data

US 2010/0040357 A1 Feb. 18, 2010

Related U.S. Application Data

(63) Continuation of application No. PCT/JP2008/066539, filed on Sep. 12, 2008.

(30) Foreign Application Priority Data

Oct. 16, 2007 (JP) .................... 2007-269080

(51) Int. Cl.
*G03B 3/10* (2006.01)
*G02B 7/04* (2006.01)

(52) U.S. Cl. ......... 396/144; 396/133; 348/345; 348/357

(58) Field of Classification Search .............. 396/133, 396/144
See application file for complete search history.

(56) References Cited

U.S. PATENT DOCUMENTS

| | | | | | |
|---|---|---|---|---|---|
| 4,779,114 | A | * | 10/1988 | Kobayashi | 396/132 |
| 5,950,021 | A | * | 9/1999 | Suzuki et al. | 396/87 |
| 7,626,775 | B2 | * | 12/2009 | Kawamoto | 359/823 |
| 7,630,624 | B2 | * | 12/2009 | Chang | 396/144 |
| 2007/0014561 | A1 | * | 1/2007 | Lee et al. | 396/133 |
| 2009/0174956 | A1 | * | 7/2009 | Kawamoto | 359/823 |

FOREIGN PATENT DOCUMENTS

| | | | |
|---|---|---|---|
| JP | 1992-130098 U | * | 2/1992 |
| JP | 4-130098 | | 11/1992 |
| JP | 5-61713 | | 8/1993 |
| JP | 2006-284730 A1 | | 10/2006 |
| JP | 2007-102141 A1 | | 4/2007 |
| JP | 2007-256786 A1 | | 10/2007 |
| JP | 2007292880 A | * | 11/2007 |

OTHER PUBLICATIONS

Machine translation of JP2007-292880 (corresponding application No. 2006-118278) obtained from JPO website.*
International Search Report for International Application No. PCT/JP2008/066539 dated Oct. 14, 2008.
Chinese Office Action mailed Aug. 11, 2010 with English translation (9 pages).
Korean Office Action mailed May 20, 2011 with English translation (9 pages).
Decision of Refusal received from the Korean Intellectual Property Office on counterpart application No. 10-2009-7020996 mailed Nov. 21, 2011 with English translation (5 pages).

* cited by examiner

*Primary Examiner* — Clayton E Laballe
*Assistant Examiner* — Bret Adams
(74) *Attorney, Agent, or Firm* — Kratz, Quintos & Hanson, LLP

(57) ABSTRACT

A lens drive device includes: a lens holder holding a lens; a drive source including a rotor rotatably supported; a gear rotated by a rotation of the rotor; and a driven gear rotated by the gear. The lens holder is moved in an optical axis direction by a rotation of the driven gear. The driven gear includes a teeth portion. The teeth portion includes: a meshed portion meshing the gear; and a non-meshed portion abutting the gear to stop the rotations of the gear and the driven gear.

2 Claims, 6 Drawing Sheets

LENS DRIVE DEVICE

CROSS-REFERENCE TO RELATED APPLICATION

This application is a continuation of and claims priority to International Patent Application No. PCT/JP2008/066539 filed on Sep. 12, 2008, which claims priority to Japanese Patent Application No. 2007-269080 filed on Oct. 16, 2007, subject matter of these patent documents is incorporated by reference herein in its entirety.

BACKGROUND OF THE INVENTION

1. Field of the Invention

The present invention relates to lens drive devices installed in image pickup devices. More specifically, the present invention relates to a lens drive device moving a lens in the optical path direction by use of a cam member.

2. Description of the Related Art

Recently, an image pickup apparatus, such as a still camera or a camera built in a mobile phone, has been smaller in size significantly. There is such an image pickup apparatus which includes a lens drive device moving a lens to a focused point in accordance with the position of the object. Thus, the lens drive device which has a smaller size and a high focus accuracy is required.

Japanese Unexamined Utility Model Application Publication No. 5-61713 discloses a lens drive mechanism which moves a lens in the optical axis direction by use of a cam member. In this lens drive mechanism, the lens can be driven with a simple structure having a cam member. Further, this lens drive mechanism has plural switches for detecting a position of the cam member. The lens drive mechanism recognizes the initial position or a partway position by using these switches, thereby adjusting the focus with high accuracy. More specifically, this lens drive mechanism has a mechanical switch for detecting the initial position of the cam, and a photo interrupter (optical switch) for detecting a substantial middle position of the driving range of the cam so as to detect the position of the cam.

The above lens drive mechanism disclosed in Japanese Utility Model Application Publication No. 5-61713 has a simple structure, since the cam structure drives the lens. However, the above lens drive mechanism detects the position of the cam member by using the plural switches. This requires a space for arranging the switches within the mechanism, thus enlarging the structure of the lens drive mechanism. In accordance with this, plural expensive switches are used, thereby causing a problem of increase in the manufacturing cost.

SUMMARY OF THE INVENTION

It is therefore an object of the present invention to provide a lens drive device in which its size and its manufacturing cost are reduced and in which a lens is focused with accuracy.

According to an aspect of the present invention, there is provided a lens drive device including: a lens holder holding a lens; a drive source including a rotor rotatably supported; a gear rotated by a rotation of the rotor; and a driven gear rotated by the gear, wherein: the lens holder is moved in an optical axis direction by a rotation of the driven gear; the driven gear includes a teeth portion; and the teeth portion includes: a meshed portion meshing the gear; and a non-meshed portion abutting the gear to stop the rotations of the gear and the driven gear.

BRIEF DESCRIPTION OF THE DRAWINGS

Preferred embodiments of the present invention will be described in detail with reference to the following drawings, wherein.

DESCRIPTION OF THE PREFERRED EMBODIMENTS

Figure 1:
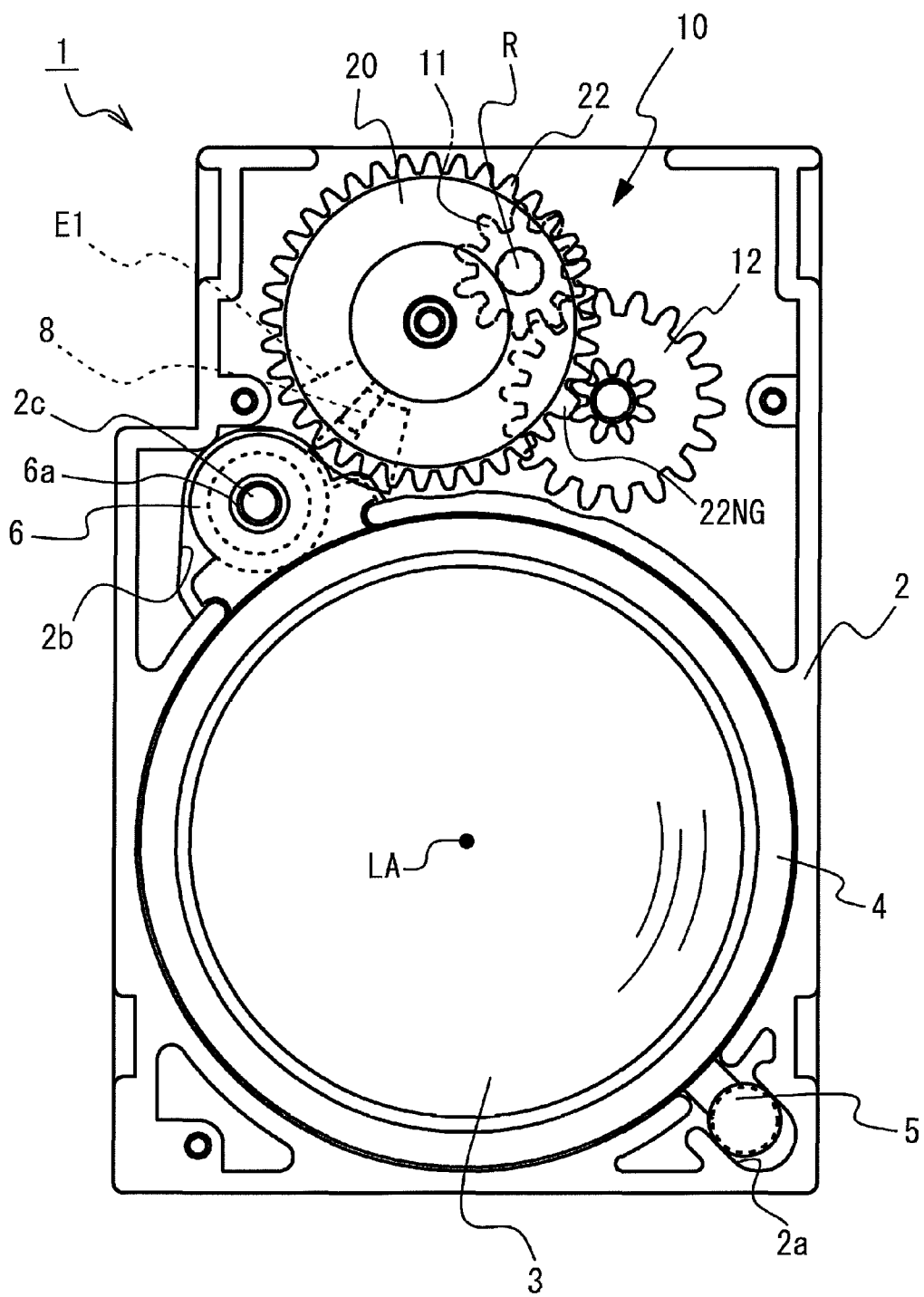
FIG. 1 is a plane view showing a lens drive device according to an embodiment of the present invention.
Figure 2:
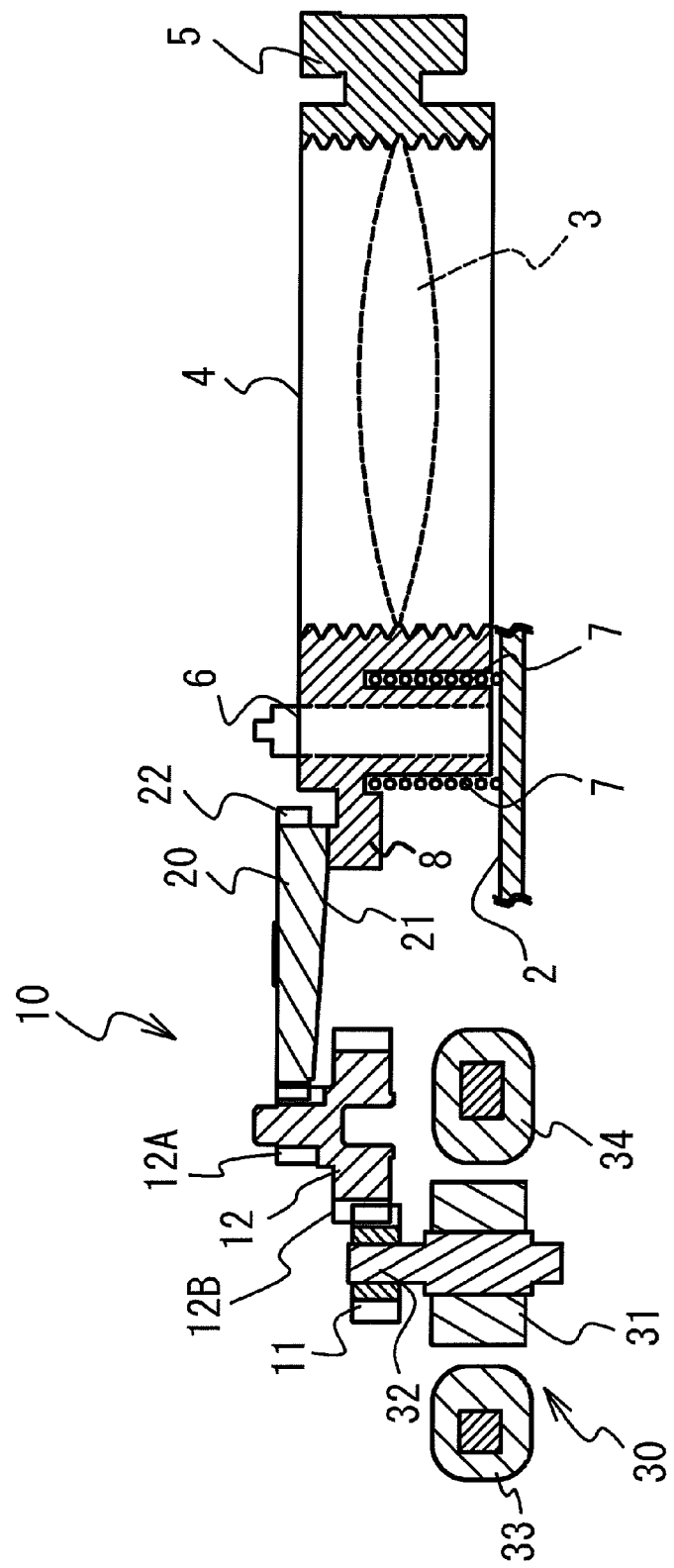
FIG. 2 is a cross-section view showing an essential part of the lens drive device shown in FIG. 1.

An embodiment of the present invention will be described below with reference to drawings. FIG. 1 is a plane view showing a lens drive device according to an embodiment of the present invention. FIG. 2 is a cross-section view showing an essential part of the lens drive device shown in FIG. 1. In order to recognize the positional relationships among configuration parts, FIG. 2 shows an expanded view of each position of parts behind other parts. The lens drive device 1 will be described with reference to FIGS. 1 and 2.

The lens drive device 1 has a basal plate 2 on which various parts to be mentioned below are mounted. A lens holder 4 holding a lens 3 is arranged for movement in the optical path direction LA perpendicular to a plane surface of the basal plate 2. Specifically, the lens holder 4 has guiding portions 5 and 6 extending radially and outward. Each end of guiding portions 5 and 6 is formed into a columnar shape. The basal plate 2 has receiving portions 2a and 2b for receiving cylindrical portions of the above guiding portions 5 and 6 respectively. Additionally, the basal plate 2 has a guiding pin 2c standing at a center portion of the receiving portion 2b. The guiding pin 2c is inserted into a hole portion 6a formed in the cylindrical portion of the guiding portion 6. With such a configuration, the lens holder 4 is arranged to move in the optical path direction LA.

Referring now to FIG. 2, a coil spring 7, serving as a biasing member, is inserted into the guiding portion 6 in such a manner to surround the cylindrical portion of the guiding portion 6 formed in the lens holder 4. The lens holder 4 is biased upwardly by this coil spring 7. Further, the above lens holder 4 has an arm portion 8, serving as an engagement portion, extending to an outward from the lens holder 4. Since the lens holder 4 is biased upwardly in FIG. 2 by the coil spring 7, the arm portion 8 is also biased upwardly in FIG. 2. This biasing force brings the arm portion 8 to be in contact with a cam surface 21 of a cam gear (driven gear) 20 to be mentioned later.

Further, referring to FIGS. 1 and 2, a configuration of a drive mechanism 10 for moving the lens holder 4 in the optical path direction LA will be described. This drive mechanism 10 includes a train of gears having the above cam gear 20.

The drive mechanism 10 has a step motor 30 serving as a drive source. The step motor 30 causes the rotor 31 to rotate, so that the lens holder 4 is moved in the optical axis direction LA via the cam gear 20, serving as a driven gear, and the like. The step motor 30 includes the rotor 31, a rotor shaft 32, a stator 33, and coils 34.

The rotor 31 is rotated by a rotational torque, which is generated by a magnetic force generated between the rotor 31 and the stator 33, and is rotatably supported by the rotor shaft 32. The rotor shaft 32 is rotatably supported by the basal plate 2 and the like. The rotor 31, for example, is made of a magnetic material such as a rare earth material or an iron material. The rotor 31 has a cylindrical shape or a circular plate shape with a small diameter. The rotor 31 has alternately plural different magnetic poles in a rotational direction thereof. These magnetic poles are provided at even intervals in the rotational direction of the rotor 31.

A gear 11 fixed onto the rotor shaft 32 of this step motor 30 meshes a cam gear 20 via an idle gear 12. The cam gear 20 serving as a driven gear has a base material with a circular plate shape, like a general gear. The cam gear 20 is provided with a teeth portion 22 at its peripheral edge. The teeth portion 22 includes plural teeth arranged in a ring shape. The cam gear 20 is driven by the gear 12A. Further, the cam gear 20 is provided with a cam surface 21, which has a spiral shape, at its one surface side. In the present embodiment, this cam surface 21 is provided at a lower surface side of the cam gear 20. This cam surface 21 abuts the arm portion 8, as mentioned above, of the lens holder 4.

Figure 3:
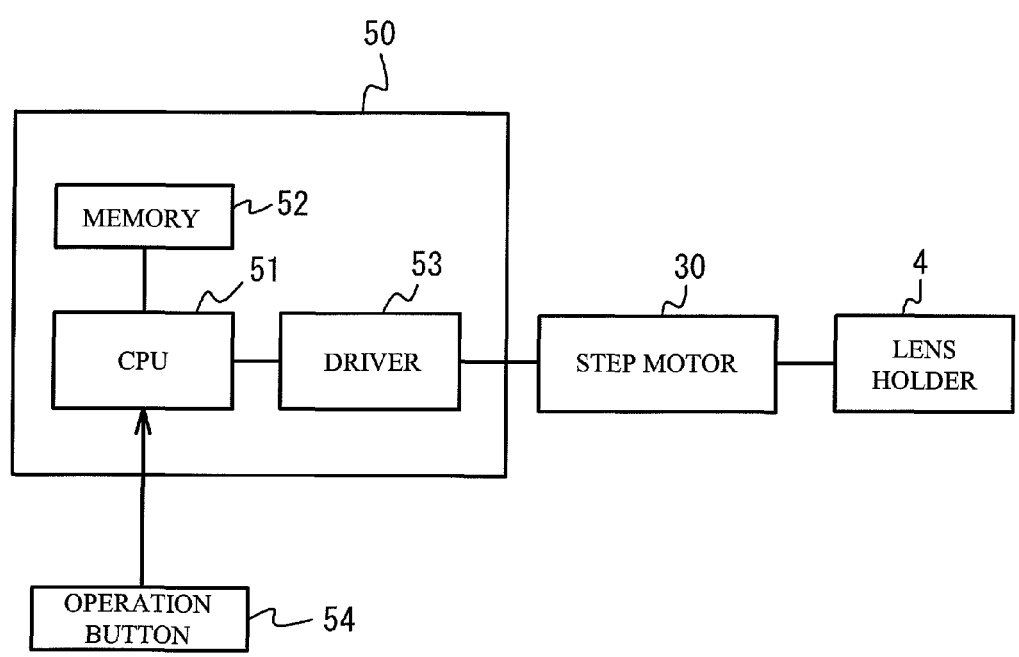
FIG. 3 is block diagram of a control circuit for controlling the lens drive device.

Herein, a description will be given of a control circuit for controlling the lens drive device 1 with reference to FIG. 3. FIG. 3 is a block view of the control circuit for controlling the lens drive device. A control unit 50 includes a CPU (Central Processing Unit) 51, a memory 52, and a driver 53, as illustrated in FIG. 3. The CPU 51 controls the entire operation of the lens drive device 1 and processor arithmetic. Programs and the controlling information for controlling the lens drive device 1 are stored in the memory 52. The driver 53 applies positive and negative voltages to the coils 34 in a pulse manner to energize the coils 34, in response to a control signal outputted from the CPU 51. An operation button 54 is connected to the CPU 51.

When the operation button 54 is pushed, the CPU 51 instructs the driver 53 to output positive and negative voltages for driving the step motor 30. The driver 53 applies positive and negative voltages to the coils 34 in response to the instruction. In this manner, the rotor 31 is rotated clockwise or counterclockwise by controlling the current passing through the coils 34 of the step motor 30, thereby moving the lens holder 4 in the optical axis direction and adjusting the focus, as mentioned above.

Figure 4:
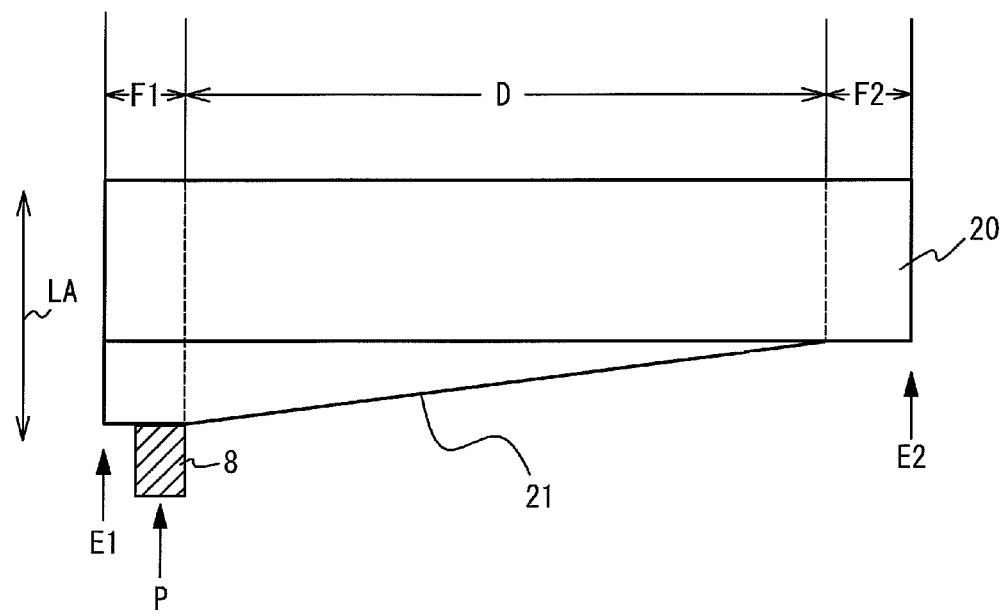
FIG. 4 is a schematic view showing an expanded side surface of a cam gear.

FIG. 4 is a schematic view showing an expanded side surface of the cam gear 20. As shown in FIG. 4, the cam surface 21 includes a slope region D and plane regions F1 and F2 located at both ends of the slope region D, respectively. Actually, cam surface has a spiral shape in such a way that ends E1 and E2 are connected to each other. This defines a step at a position indicated by the end E1 of the cam gear 20. In addition, the end E1 and the plane region F1 of the cam surface 21 as shown in FIG. 4 correspond to the infinite position, on the initial position side, to which the focal point of the lens 3 is brought. Moreover, the end E2 and the plane region F2, correspond to the closest position in the focal point of the lens 3, on the terminal position side. Also, when the arm portion 8 is in contact with the slope region D of the cam surface 21, the lens holder 4 moves in the optical path direction LA.

Since the arm portion 8 is biased to be in contact with the cam surface 21 with the above configuration, the cam gear 20 is rotated by a rotational force applied from the step motor 30, whereby the arm portion 8 moves over the cam surface 21. Consequently, the lens holder 4 to which the arm portion 8 is secured moves in the optical path direction LA within a predetermined range (range of the slope region D). As a result, the controlling of the step motor 30 allows the lens holder 4 to move from the initial position to the terminal position through the focused point.

Figure 5A:
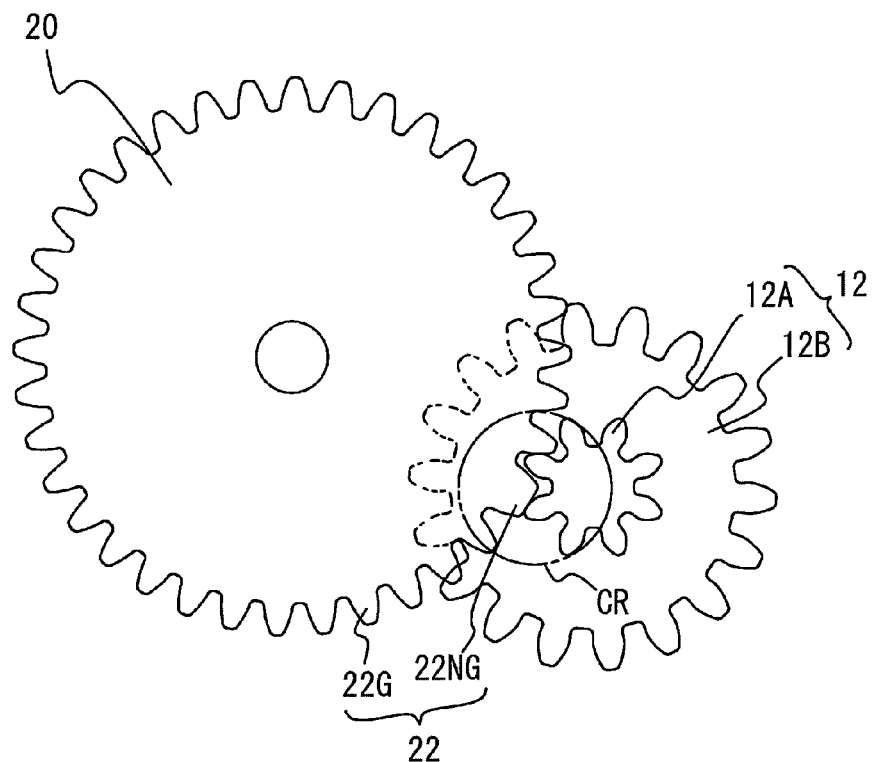
FIG. 5A is a view showing the cam gear and an idle gear shown in FIG. 1.
Figure 5B:
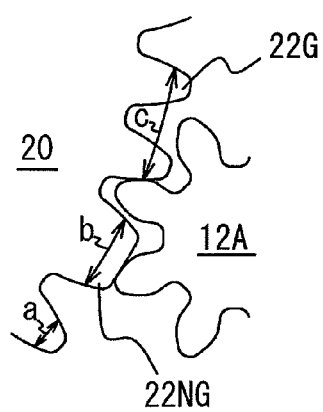
FIG. 5B is an enlarged view showing an inside of a circle CR shown in FIG. 5A.

Furthermore, the lens drive device 1 according to the present embodiment of the present invention has a configuration for determining a moved position of the lens holder 4. This configuration will be described with reference to FIGS. 5A and 5B. FIG. 5A is a view showing the cam gear 20 and the idle gear 12 shown in FIG. 1, and FIG. 5B is an enlarged view showing an inside of a circle CR shown in FIG. 5A.

The idle gear 12 includes two gears arranged concentrically with each other. A gear 12A, a smaller one in FIG. 4A, is meshed with the teeth portion 22 formed in the periphery of the cam gear 20. A gear 12B, a bigger one in FIG. 4A, is meshed with the gear 11 (see FIG. 1) fitted onto the rotor shaft 32 of the step motor 30. The teeth portion 22 of the cam gear 20 is provided with a meshed portion 22G meshed with the gear 12A and a non-meshed portion 22NG not meshed with the gear 12A. The meshed portion 22G is composed of plural teeth.

The non-meshed portion 22NG is a tooth formed such that tooth thickness is thicker than that of one of the meshed portion 22G. The number of the teeth of the cam gear 20 is not an integer, but a decimal. The non-meshed portion 22NG is located at such a position where a part corresponding to one circular pitch cannot be formed correctly. Therefore, as shown enlarged in FIG. 5B, the non-meshed portion 22NG is formed such that two teeth are combined by burying the tooth groove. In this configuration, tooth thickness of the non-meshed portion 22NG is thinner than that of a tooth such that two teeth are combined by burying the tooth groove of the meshed portion 22G.

That is to say, a tooth thickness b of the non-meshed portion 22NG is about 0.3 to less than 1.0 times as thickness as a tooth thickness c of the tooth formed such that two teeth are combined by burying the tooth groove of the meshed portion 22G. About 0.5 times is preferable. Supposing that the non-meshed portion 22NG is considered to be one tooth, the tooth thickness b of the non-meshed portion 22NG is about 1.3 to less than 3.0 times as thickness as a tooth thickness a of the meshed portion 22G. About 1.5 times is preferable.

As mentioned above, the non-meshed portion 22NG is formed in the teeth portion 22 of the cam gear 20. As a result, when the idle gear 12 is rotated in one direction and the gear 12A is brought into contact with the non-meshed portion 22NG, the cam gear 20 is stopped forcibly. Likewise, even when the idle gear 12 is rotated in the inverse direction and the gear 12A comes into contact with the non-meshed portion 22NG, the cam gear 20 is stopped forcibly. That is to say, the cam gear 20 is rotated within a range of slightly less than one rotation (corresponding to a range where the length of the non-meshed portion 22NG is subtracted from the length of one rotation).

Herein, if the positions of both ends in which the cam gear 20 is stopped forcibly are preset to be respectively associated with the initial position and the terminal position of the above lens holder 4, the cam gear 20 is stopped forcibly at the initial position and the terminal position, respectively. That is to say, when the cam gear 20 is rotated in one direction and is then stopped, the lens holder 4 is positioned at the initial position or the terminal position. Likewise, when the cam gear 20 is rotated in its reverse direction and is then stopped, the lens holder 4 is positioned at the initial position or the terminal position. The CPU 51 determines the rotational direction of the step motor 30, and this allows determining of whether the lens holder 4 is stopped at the initial position or the terminal. Therefore, with the lens drive device 1 according to the embodiment of the present invention, it is easy to determine the initial position or the terminal position of the lens holder 4 without the provision of a switch.

More specially, the CPU 51 determines the rotational number of the step motor 30 necessary for movement from the initial position to the terminal position, then the CPU 51 may preset the number of the driving pluses outputted from the CPU 51 to the step motor 30. For example, it is designed such that the step motor 30 rotates a given number of times to move the lens holder 4 from the initial position to the terminal position when the driver 53 outputs 1000 pluses in response to a control signal outputted from the CPU 51.

Consequently, for example, when the lens holder 4 is moved from the initial position to the terminal position, the output of the 1000 pluses is merely instructed to the step motor 30 from the CPU 51 to complete the movement. In view of this action of the cam gear 20, the cam gear 20 is rotated by a range of slightly less than one rotation, and the non-meshed portion 22NG comes into contact with the gear 12A, whereby the cam gear 20 is stopped forcibly. Additionally, in light of gear backlash or assembly margin, it is more preferable that predetermined margin pulses be added to the number of the driving pulses outputted from the CPU 51 to the step motor 30. That is to say, in design, in the case where the lens holder 4 is allowed to move from the initial position to the terminal position by 1000 pluses, it is a preferable that the non-meshed portion 22NG certainly come into contact with the gear 12A by additionally outputting 4 or 5 pulses. This certainly moves the lens holder 4 from the initial position to the terminal position.

When the lens holder 4 moves between the initial position and the terminal position so as to adjust the focus of the lens 3, the position of the lens holder 4 can be recognized on the basis of the number of the driving pulses outputted from the CPU 51 with the initial position or the terminal position. Therefore, this eliminates a switch for recognizing a partway position of the lens holder 4. In addition, when the lens holder 4 is moved from the partway position to the initial position or the terminal position, it is preferable that predetermined margin pulses be added to the number of the driving pulses, as described above. Accordingly the current position of the lens holder 4 is recognized on the basis of the initial position or the terminal position with high accuracy. This permits the lens 3 to move to the focused point with high accuracy.

In the lens drive device 1 as mentioned heretofore, the non-meshed portion 22NG is provided in the teeth portion 22 of the cam gear 20, whereby the cam gear 20 rotates by a predetermined range and is then stopped forcibly. The position where the cam gear 20 is stopped forcibly is associated with the initial position or the terminal position, thus eliminating the need for a switch for detecting the initial position or the terminal position of the lens holder 4. Additionally, with a simple structure that the non-meshed portion 22NG is provided in a part of the teeth portion 22 of the cam gear 20, downsizing and simplification of the structure are promoted, thus reducing the manufacture cost. Additionally, the lens drive device 1 can be downsized, thereby widening a cam region of the cam gear 20, and ensuring a large number of focused points. In a case where a highest level of the cam is identical to the conventional one, the cam is made to have gentle slope, and this contributes to the decrease in the drive load.

In addition, the forcible stop eliminates the consideration of a play between the gears or the like, and minimizes length of the plane regions F1 and F2 on the cam surface 21 to be smaller than that of a conventional one. In the case where the position is detected by a switch, the arm portion 8 might move beyond the end E1 and fall onto the end E2. Therefore, the plane regions F1 and F2 are conventionally designed such that the total length is a minimal length plus a marginal one. This is because when the arm portion 8 falls onto the end E2, the position of the rotor at this time misaligns its original terminal position (end E2) and is different from the designed position. In such a case, even if the CPU 51 causes the arm portion 8 to move form the terminal position to the initial position, the stop position of the rotor at the initial position misaligns with respect to its original stop position. Therefore, the control of the rotor from the initial position is difficult. Further, as mentioned above, the non-meshed portion 22NG is smaller than a tooth formed to bury adjacent teeth, whereby the plane regions F1 and F2 can be set to be narrow, and the slope region D can be set to be broad. As a result, it is possible to improve the focus accuracy, and to reduce the load applied on the arm portion 8 to smoothly move the lens holder 4.

Additionally, in the above embodiment, the cam gear 20 has the cam surface 21 at the one side thereof, and the cam surface 21 is brought into contact with the arm portion 8 of the lens holder 4 by the biasing force of the coil spring 7. Although the cam surface 21 of the cam gear 20 corresponds to the cam portion, in the above embodiment, the present invention is not limited to this structure. There may be additionally provided a cylindrical body which rotates in conjunction with the cam gear 20 and which has a cam groove on a body portion (side peripheral portion) of the cylindrical body, so that this cam groove may be engaged with the arm portion 8 to drive the lens holder 4 in the same manner as described above. In this case, the cam groove serves as the cam portion.

Herein, a description will be given of the stop position of the rotor 31 located at the initial position state where the gear 12A and the cam gear 20 are stopped by abutting the gear 12A with the non-meshed portion 22NG, as illustrated in FIGS. 5A and 5B.

Figure 6A:
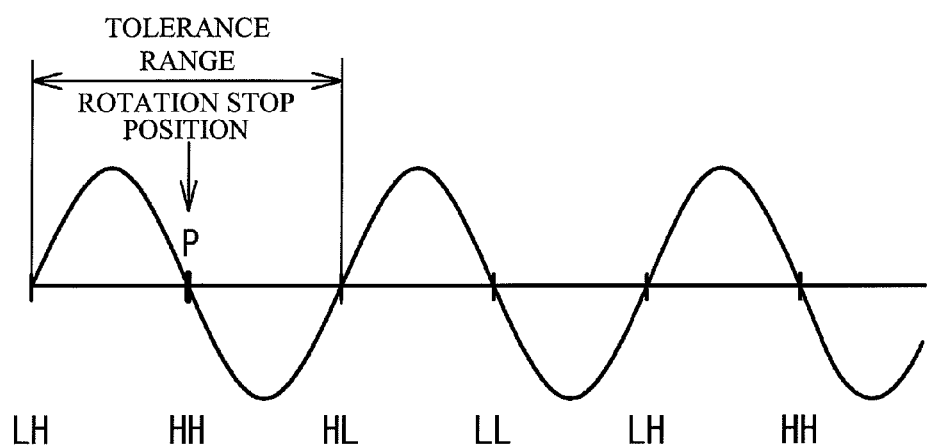
FIG. 6A is a graph of a detent torque and an energized state of a rotor.
Figure 6B:
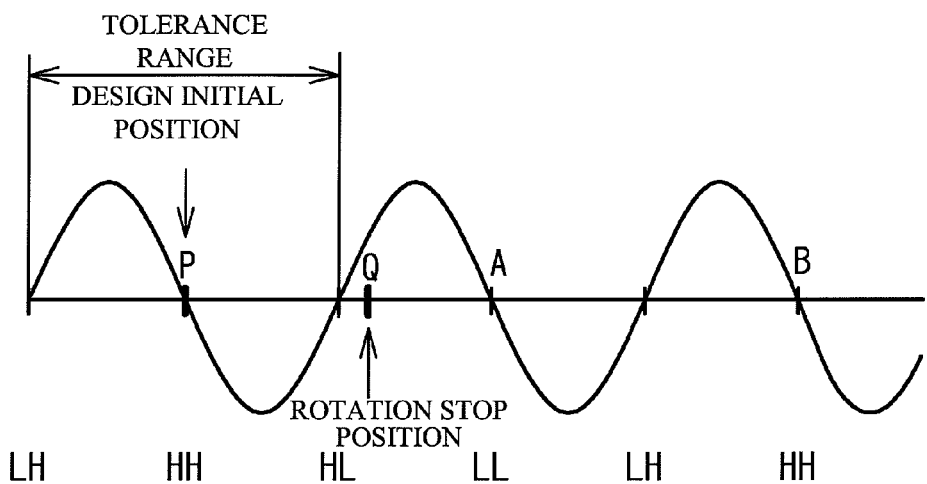
FIG. 6B is a graph in where an initial stop position is a position A.

FIGS. 6A and 6B illustrate a curve of detent torque of the rotor 31 and the manner for energizing two coils 34. "H" represents a state in which the current flows in a forward direction, and "L" represents a state in which the current flows in the reverse direction. For example, "HH" energization represents a state in which the current flows in two coils 34 in the forward direction, and "HL" energization represents a state in which the current flows in one of coils 34 in the forward direction and the current flows in the other of the coils 34 in the reverse direction.

In the initial position state, the rotor 31 is positioned at a position P or a middle position (corresponding to sine 180 degrees) of the detent torque curve of the rotor 31, the detent torque curve tracing a sine curve in the range from 0 to 360 degrees. The position P is where the rotor 31 stops when the HH energization is applied. Further, the position P is where the rotor 31 remains stopped by a detent torque after the HH energization is cut. That is, the position where the rotor 31 can remains without energizing the step motor 30 is matched to the position where the rotor 31 is stopped by abutting the gear 12A with the non-meshed portion 22NG.

In addition, when the gear 12A and the non-meshed portion 22NG are abutted by applying the HH energization, the stop position of the rotor 31 may not be matched to the position P depending on the accuracy of parts. However, providing that the rotor 31 is adjusted to stop within the range (tolerance range) of the curve corresponding to the sine curve of the detent torque in the range form 0 to 360 degrees with the position P (sine 180 degrees) used as a center, the rotor 31 can be retuned to the position P. For this reason, in the design, an error of position, where the gear 12A and the non-meshed portion 22NG are abutted by performing an initial position energization (HH energization), is designed within a sine curve, of the detent torque of the rotor 31 in the range from 0 to 360 degrees. Therefore, when the HH energization is performed as the initial position energization after the gear 12A and the non-meshed portion 22NG are abutted, a start position always corresponds to the position P. This controls the lens position with accuracy, and focuses the lens with accuracy.

That is, the stop position of the rotor 31 is substantially matched to the stop position of the rotor 31 when the initial position energization is applied. Herein, a term "substantially matched" means that the rotor 31 stops within the tolerance range illustrated in FIG. 6 when the initial position energization is applied.

As illustrated in FIG. 6B, if the gear 12A and the non-meshed portion 22NG are abutted by applying the initial position energization (HH energization) at a position Q where the rotor 31 stops out of the tolerance range (a sine wave of the detent torque in the range from 0 to 360 degrees with the initial energization position used as a center), when the energization of the coils 34 is cut, the rotor 31 is stopped at not the design initial position P but the position A with stability. In this state, when the initial position energization (HH energization) is applied in order to move the lens, the rotor 31 is likely to the HH energization position of the position P and may reach the position Q by strongly pushing the gear 12A and the non-meshed portion 22NG, or may reach the position B as a HH energization position. For this reason, even when the initial position energization (HH energization) is applied, the position of the rotor 31 is not constant, thus the lens position cannot be controlled with accuracy. However, as mentioned above, the gear 12A and the non-meshed portion 22NG are abutted within the tolerance range, thereby overcoming such a problem.

While the preferred embodiment of the present invention have been illustrated in detail, the present invention is not limited to the above-mentioned embodiment, and other embodiments, variations and modifications may be made without departing from the scope of the present invention.

In the above embodiment, tooth thickness of the non-meshed portion 22NG is made thicker than that of the meshed portion 22G. However, the present invention is not limited to this configuration. For example, the tooth depth of the non-meshed portion is greater than that of the meshed portion 22G. Further, the cam gear 20 is provided as the driven gear. However, the present invention is not limited to this configuration, a gear not having a cam may be employed as the driven gear, and the lens holder 4 may be moved by a train of gears.

In the above embodiment, although the idle gear 12 is located between the cam gear 20 and the gear 11 fitted onto the rotor shaft 32 of the step motor 30, the present invention is not limited to this structure. Another gear may be located between the gear 11 and the cam gear 20 as needed. Alternatively, the gear 11 and the cam gear 20 may be directly meshed with each other as needed.

Finally, several aspects of the present invention are summarized as follows.

According to an aspect of the present invention, there is provided a lens drive device including: a lens holder holding a lens; a drive source including a rotor rotatably supported; a gear rotated by a rotation of the rotor; and a driven gear rotated by the gear, wherein: the lens holder is moved in an optical axis direction by a rotation of the driven gear; the driven gear includes a teeth portion; and the teeth portion includes: a meshed portion meshing the gear; and a non-meshed portion abutting the gear to stop the rotations of the gear and the driven gear.

In the lens drive device according to an embodiment of the present invention, since the driven gear has the teeth portion including: the meshed portion meshing with the gear; and the non-meshed portion abutting with the gear to stop rotations of the gear and the driven gear, the gear is stopped forcibly at a predetermined position. Herein, if the above stop position is preset to be associated with an initial position or a terminal position of the lens holder, and the number of the pluses or the number of the rotation of the driving source, for moving the lens holder from the initial position to the terminal position, is preset, a position of the lens holder is recognized. Therefore, unlike a conventional one, it is possible to move the lens holder to the focused point while its position is being recognized without a switch. Consequently, according to an aspect of the present invention, there is provided the lens drive apparatus which has a smaller size and a lower cost by simplifying the internal structure thereof and focuses the lens with accuracy.

In the above configuration, a stop position where the rotor is stopped by abutting the gear with the non-meshed portion may be substantially identical to a stop position where the rotor is stopped when an energization is applied at an initial position.

With such a configuration, the positional accuracy of the stop position of the rotor in the initial position when energized can be ensured, and the lens can be focused with accuracy.

In the above configuration, the driven gear may be a cam gear including a cam for moving the lens holder in the optical axis direction.

With such a configuration, the structure can be simplified to reduce the size and the cost.

In the above configuration, tooth thickness of the non-meshed portion may be thicker than that of the meshed portion.

With such a configuration, the rotations of the gear and the cam gear can be stopped.

In the above configuration, the rotor may be maintained at the initial position in a non-energized state, when the rotor is positioned at the initial position. With such a configuration, even when the drive source turns off after the lens moves to an initial position, the rotor is maintained in its initial position. Therefore, unlike a conventional one, a switch for detecting the initial position can be eliminated, thus the structure can be simplified to reduce the size and the cost.

What is claimed is:

1. A lens drive device comprising:
a lens holder holding a lens;
a drive source including a rotor rotatably supported;
a gear rotated by a rotation of the rotor; and
a driven gear rotated by the gear, the driven gear being a cam gear, having a cam surface, for moving the lens holder in an optical axis direction, the cam surface including a first plane region, a second plane region, and a sloped region sandwiched between the first and second plane regions, wherein:
the lens holder, including an arm portion, is moved in the optical axis direction by a rotation of the driven gear;
the driven gear includes a teeth portion; and
the teeth portion includes:
a meshed portion meshing the gear; and
a non-meshed portion abutting the gear to stop the rotations of the gear and the driven gear, a thickness of the non-meshed portion being about 1.3 to less than 3.0 times a thickness of the meshed portion,
wherein a stop position where the rotor is stopped by abutting the gear with the non-meshed portion is substantially identical to a stop position where the rotor is stopped when an energization is applied at an initial position, and wherein the arm portion of the lens holder abuts the cam surface, and the arm portion abuts one of the first and second plane regions when the rotor is stopped.

2. The lens drive device of claim 1, wherein the rotor is maintained at an initial position in a non-energized state, when the rotor is positioned at the initial position.

* * * * *